(No Model.)
L. J. TRECY.
HOT AIR FURNACE.
No. 471,038. Patented Mar. 15, 1892.
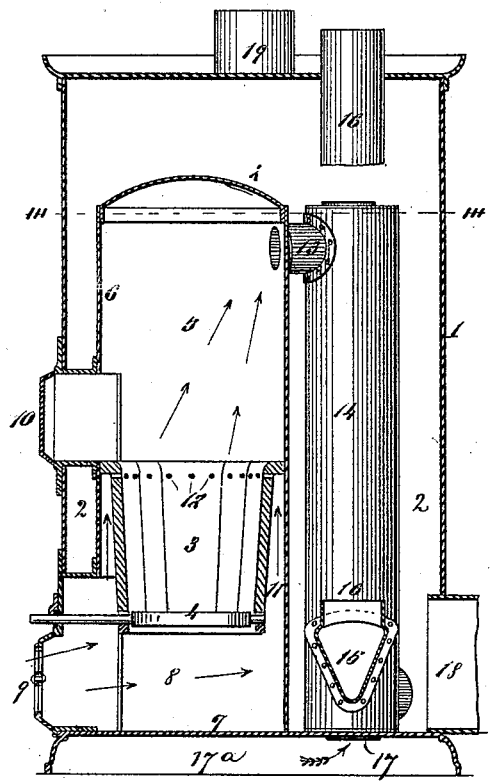
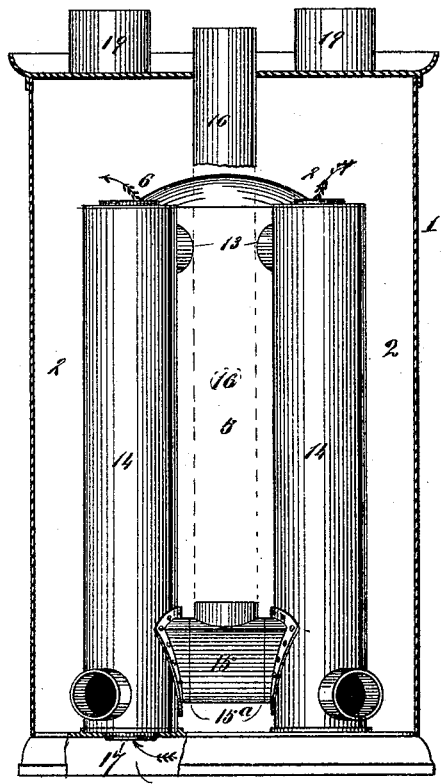
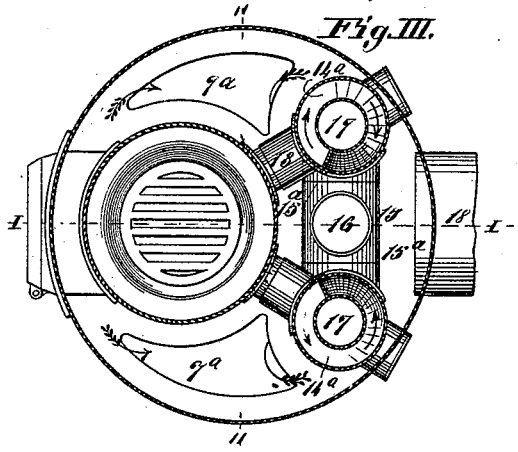
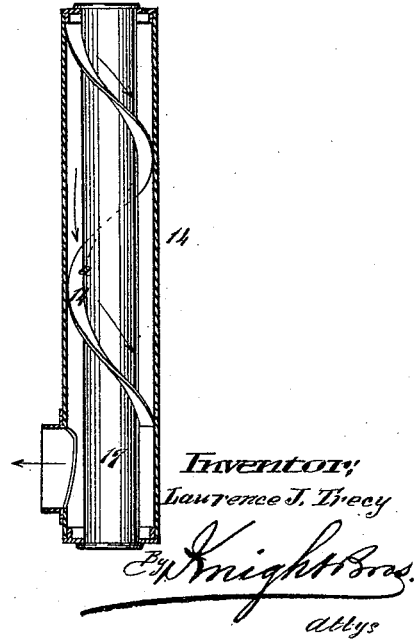
Attest:
Geo. E. Cruse
S. Cotton
Inventor:
Laurence J. Trecy
By Knight Bros.
Attys

UNITED STATES PATENT OFFICE.

LAURENCE J. TRECY, OF ST. LOUIS, MISSOURI, ASSIGNOR TO THE CHAMPION HEATING AND VENTILATING COMPANY, OF MISSOURI.

HOT-AIR FURNACE.

SPECIFICATION forming part of Letters Patent No. 471,038, dated March 15, 1892.

Application filed April 21, 1891. Serial No. 389,815. (No model.)

*To all whom it may concern:*

Be it known that I, LAURENCE J. TRECY, of the city of St. Louis, in the State of Missouri, have invented a certain new and useful Improvement in Hot-Air Furnaces, of which the following is a full, clear, and exact description, reference being had to the accompanying drawings, forming part of this specification.

My invention relates to certain improvements in hot-air furnaces, the object being to produce an inexpensive, efficient, and durable furnace; and my invention consists in features of novelty hereinafter fully described, and pointed out in the claims.

Figure I is a vertical section through my improved furnace, taken on line I I, Fig. III. Fig. II is a similar view taken on line II II, Fig. III. Fig. III is a transverse section taken on line III III, Fig. I. Fig. IV is a vertical section through one of the flues.

Referring to the drawings, 1 represents a cylinder or casing forming a hot-air chamber 2.

3 represents the fire-box, having a grate 4 and over which is the combustion-chamber 5, formed by a cylinder 6, which extends down beneath the fire-box to the base 7 of the furnace and forming an ash-pit 8 beneath the fire-box. The base 7 forms an air-chamber $17^a$.

9 represents the door of the ash-pit, and 10 the door of the fire-box.

The wall of the fire-box is made tapering, as shown in Fig. I, so as to leave an annular space 11 for the passage of air from the ash-pit, as shown by the featherless arrows, and which escapes into the upper part of the fire-box through perforations 12. A portion of the air from the ash-pit also passes up through the grate-bars, and the entrance of air through the perforations, in addition to that which enters through the grate, affords a large amount of oxygen for the thorough combustion of the fuel.

The heat and products of combustion pass from the upper part of the chamber 5, through pipes 13, into flues 14, in which they descend and pass from the lower part of the flues 14 through a pipe 15 into a smoke-pipe 16, which conveys them to the chimney or uptake. The pipe 15 has joints at $15^a$, so that the flues 14 can be readily connected and disconnected for cleaning, &c., and instead of the pipe being round in cross-section it is triangular in shape, so that a free circulation is permitted through its upper part, while the soot will accumulate in its lower part and can be easily removed. The flues 14 are closed at top and bottom, and within them and projecting through their respective heads are hot-air pipes 17. The air to be heated enters the chamber 2 through a cold-air duct 18, and after being heated in the chamber passes through holes $7^a$ in the base 7 and through the chamber $17^a$, and circulates up through the pipes 17, as well as up through the main body of the chamber 2, around the flues 14 and pipe 16, and the hot air is carried from the chamber 2 through the usual hot-air pipes 19. By providing the air-pipe 17 within the flues 14 a very large and efficient amount of heating-surface is provided, and the furnace as a whole is effective, cheap, and durable. To prevent the possibility of the heat and products of combustion passing down one side only of the flues 14, I arrange flights $14^a$ in the spaces between the flues and the pipes 17, as shown in Fig. IV, and thus the pipes 17 are heated on all sides.

I claim as my invention—

1. In a hot-air furnace, the combination of a base having openings in its top and forming an air-chamber, an outer casing forming a hot-air chamber, an inner cylinder seating on the base and forming a combustion-chamber, flues having closed ends and communicating at one end with said cylinder and at the other end with a smoke-pipe, and air-pipes open at both ends and located within said flues, so as to connect the base-chamber with the hot-air chamber, substantially as and for the purpose set forth.

2. In a hot-air furnace, the combination of a base having openings in its top and forming an air-chamber, an outer casing forming a hot-air chamber, an inner cylinder seating on the base and forming a combustion-chamber, flues having closed ends and communicating at one end with said cylinder and at the other end with a smoke-pipe, air-flues open at both ends and located within said flues, so as to connect the base-chamber with the hot-air chamber, and flights located in the space between the flues and the pipes, substantially as and for the purpose set forth.

3. In a hot-air furnace, the combination of the casing 1, having a base 7 with openings 7ª and forming a chamber 2, a cylinder 6, forming a chamber 5, a fire-box located within the chamber 5, flues 14, communicating with the chamber 5 through pipes 13, a smoke-pipe 16, communicating with the flues 14 through a pipe 15, hot-air pipes 17, located within the flues 14, and flights 14ª, all substantially as and for the purpose set forth.

4. In a hot-air furnace, the combination of the outer case 1, cylinder 6, flues 14, communicating with said cylinder at top, a pipe 15, connecting the flues at bottom, and a smoke-pipe 16, said pipe 15 having a triangular shape in transverse section, substantially as and for the purpose set forth.

5. The combination of the casing 1, forming the hot-air chamber 2, the base 7, having openings 7ª and forming a hot-air chamber 17ª, a cylinder 6, extending from the base into the upper part of the casing, the fire-box 3, located in the cylinder and dividing the latter into an ash-pit 8 and a combustion-chamber 5, the flues 14, closed at the top and extending from the base, the pipes 13, connecting the flues with the combustion-chamber, the horizontal pipe 15, connecting the lower ends of the flues, the central smoke-pipe 16, connected with the horizontal pipe, and the hot-air pipes 17, extending through the flues and through the base, substantially as described.

6. The combination of the casing 1, forming a hot-air chamber 2, the base 7, having openings 7ª and forming a hot-air chamber 17ª, the cylinder 6, extending from the base into the upper part of the casing, the fire-box 3, having perforations 12 in its upper part, located in the cylinder and dividing the latter into an ash-pit 8 and a combustion-chamber 5 and leaving an annular space 11 between the fire-box and the cylinder, the flues 14, closed at the top and extending from the base, pipes 13, connecting the flues with the combustion-chamber, the horizontal pipe 15, connecting the lower ends of the flues, the central smoke-pipe 16, connected with the horizontal pipe, and the hot-air pipes 17, extending through the flues and through the base, substantially as described.

7. The combination of the casing 1, forming the hot-air chamber 2, the base 7, having openings 7ª and forming a hot-air chamber, a cylinder 6, extending from the base in the upper part of the casing, the fire-box 3, located in the cylinder and dividing the latter into an ash-pit 8 and a combustion-chamber 5, the flues 14, closed at the top and extending from the base, the pipes 13, connecting the flues with the combustion-chamber, the horizontal pipe 15, connecting the lower ends of the flues, the central smoke-pipe 16, connected with the horizontal pipe, the hot-air pipes 17, extending through the flues and through the base, and the flights 17ª, located between the hot-air pipes and the flues, substantially as described.

LAURENCE J. TRECY.

In presence of—
E. S. KNIGHT,
THOS. KNIGHT.